(12) United States Patent
Fitzmaurice et al.

(10) Patent No.: US 10,891,428 B2
(45) Date of Patent: Jan. 12, 2021

(54) ADAPTING VIDEO ANNOTATIONS TO PLAYBACK SPEED

(71) Applicant: Autodesk, Inc., San Rafael, CA (US)

(72) Inventors: George Frank Fitzmaurice, Toronto (CA); Tovi Grossman, Toronto (CA); Justin Frank Matejka, Newmarket (CA)

(73) Assignee: AUTODESK, INC., San Rafael, CA (US)

( * ) Notice: Subject to any disclaimer, the term of this patent is extended or adjusted under 35 U.S.C. 154(b) by 542 days.

(21) Appl. No.: 13/951,217

(22) Filed: Jul. 25, 2013

(65) Prior Publication Data

US 2015/0033108 A1 Jan. 29, 2015

(51) Int. Cl.
*G06F 40/169* (2020.01)
*H04N 21/439* (2011.01)
*H04N 21/235* (2011.01)
*H04N 21/472* (2011.01)
*H04N 21/2387* (2011.01)
*G11B 27/30* (2006.01)
*G11B 27/00* (2006.01)

(52) U.S. Cl.
CPC .......... *G06F 40/169* (2020.01); *G11B 27/005* (2013.01); *G11B 27/3027* (2013.01); *H04N 21/2355* (2013.01); *H04N 21/2358* (2013.01); *H04N 21/2387* (2013.01); *H04N 21/4396* (2013.01); *H04N 21/47202* (2013.01); *H04N 21/47217* (2013.01)

(58) Field of Classification Search
CPC .......... G06F 17/30; G06F 17/00; G06F 17/24; G06F 17/21; G06F 15/16; G06F 17/241; G06F 16/48; G06F 3/165; G06F 40/169
USPC .................. 715/230, 511, 512; 707/727, 728
See application file for complete search history.

(56) References Cited

U.S. PATENT DOCUMENTS

| | | | | |
|---|---|---|---|---|
| 6,956,593 | B1 * | 10/2005 | Gupta | G06F 16/48 715/751 |
| 8,140,341 | B2 * | 3/2012 | Faisman | G06F 17/30017 386/239 |
| 8,924,404 | B2 * | 12/2014 | Nagasaka et al. | 707/758 |
| 2006/0143560 | A1 * | 6/2006 | Gupta et al. | 715/512 |
| 2007/0011651 | A1 * | 1/2007 | Wagner | G06F 8/33 717/110 |
| 2008/0037952 | A1 * | 2/2008 | Nallur | G11B 27/105 386/344 |
| 2009/0106208 | A1 * | 4/2009 | Matellanes | G06F 16/367 |
| 2011/0217021 | A1 * | 9/2011 | Dubin | H04N 7/147 386/278 |

(Continued)

*Primary Examiner* — Justin S Lee
(74) *Attorney, Agent, or Firm* — Artegis Law Group, LLP (57) ABSTRACT

Embodiments presented herein include a method for altering a first annotation associated with a media file. This method may generally include the technique for receiving the media file wherein the media file contains the first annotation which is associated with a first playback speed of the media file. A second playback speed is received for the media file. A second annotation is generated based on the second playback speed of the media file based on the first annotation associated with the first playback speed of the media file. The second annotation is associated with the second playback speed of the media file and, at the second playback speed, the media file concurrently plays the second annotation.

20 Claims, 6 Drawing Sheets

(56) References Cited

U.S. PATENT DOCUMENTS

| | | | |
|---|---|---|---|
| 2012/0059954 A1* | 3/2012 | Gilson | H04N 21/234381 709/246 |
| 2012/0173959 A1* | 7/2012 | Spielberg et al. | 715/230 |
| 2012/0297284 A1* | 11/2012 | Matthews, III | G06F 17/30038 715/233 |
| 2014/0006921 A1* | 1/2014 | Gopinath | G06F 40/169 715/230 |

* cited by examiner

TEXT SUMMARIZATION SCENARIOS

600

Text Annotation 1:1 — 610

| | Text Annotation 1:1 | |
|---|---|---|
| 1. | Aaaaaa | 630 |
| 2. | Bbbbbb | 631 |
| 3. | Cccccc | 632 |
| 4. | Dddddd | 633 |
| 5. | Eeeeee | 634 |
| 6. | Ffffff | 635 |
| 7. | Ggggggg | |
| 8. | Hhhhhh | |
| 9. | Iiiiiii | |
| 10. | Jjjjjj | |
| 11. | Kkkkkk | |
| 12. | Lllllll | |

611, 612, 613, 614, 615, 616

Text Annotation 3:1 — 645

| | Scenario 1 (641) | Scenario 2 (642) | Scenario 4 (643) |
|---|---|---|---|
| | Aaaaaa~650 | Bbbbbb~661 | Aaaaaa Bbbbbb Cccccc — 671 |
| | Dddddd~654 | Eeeeee~664 | Dddddd Eeeeee Ffffff — 674 |
| | Ggggggg | Hhhhhh | Ggggggg Hhhhhh Iiiiiii |
| | Jjjjjj | Kkkkkk | Jjjjjj Kkkkkk Lllllll |

FIG. 6

ADAPTING VIDEO ANNOTATIONS TO PLAYBACK SPEED

BACKGROUND OF THE INVENTION

Field of the Invention

The invention generally relates to computer software and, more specifically, to a method for presenting material associated with an annotation at a speed corresponding to a playback speed of the media file.

Description of the Related Art

With the advent of web tutorials, television, movies, and the proliferation of video content on the web, significant portions of web content, include video elements. A wide variety of software, and hardware, is currently available to end-users for the purpose of viewing video content. Additionally, there is a wide variety of software available for annotating videos. Videos are commonly annotated with text, graphical overlays, or audio narration, to add meaning or understanding to the video content. For example, a special edition of a movie may contain a director's narration to explain the rationale behind each scene, or a tutorial video may contain text annotations, or captions, to describe what is happening at each step. In each of these examples, annotation is used to instruct or further explain a concept. The instruction may be for something as simple as knitting a pearl stitch for a sweater or as complex as programming the back end of a relational database management system. Such annotations help viewers understand what is happening in the video or for simply adding supplemental information. However, when users playback videos at speeds other than normal speed, the annotation may be presented at unintended times. This may result in the annotations becoming very difficult to understand. For example, text annotations may update too quickly to be read by a viewer. For this reason, annotations are often not displayed during a playback speeds different than the standard, or normal playback speed. Additionally, audio narrations, along with the audio track associated with video, may simply be muted when a viewer fast forwards or slows down the video playback speed.

SUMMARY OF THE INVENTION

Embodiments presented herein include a method for altering a first annotation associated with a media file. This method may generally include the technique for receiving the media file wherein the media file contains the first annotation which is associated with a first playback speed of the media file. A second playback speed is received for the media file. A second annotation is generated based on the second playback speed of the media file based on the first annotation associated with the first playback speed of the media file. The second annotation is associated with the second playback speed of the media file and, at the second playback speed, the media file concurrently plays the second annotation.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide an adaptive annotation system which presents different versions of annotations, based on the current playback speed of a media file. The system uses a default annotation set for the media file. The annotation set is a list of annotations corresponding to frames in the media file. The annotation content may be text, audio, graphics or other linked data conveyed with the media file and associated with specific frames in the media content. For audio narration, each sentence is considered as distinct annotation in the annotation set. Annotation sets are generated either automatically or manually for a variety of playback speeds faster and slower than the original playback speed. Additionally, the annotation sets can be pre-populated or generated dynamically when needed.

Figure 1:
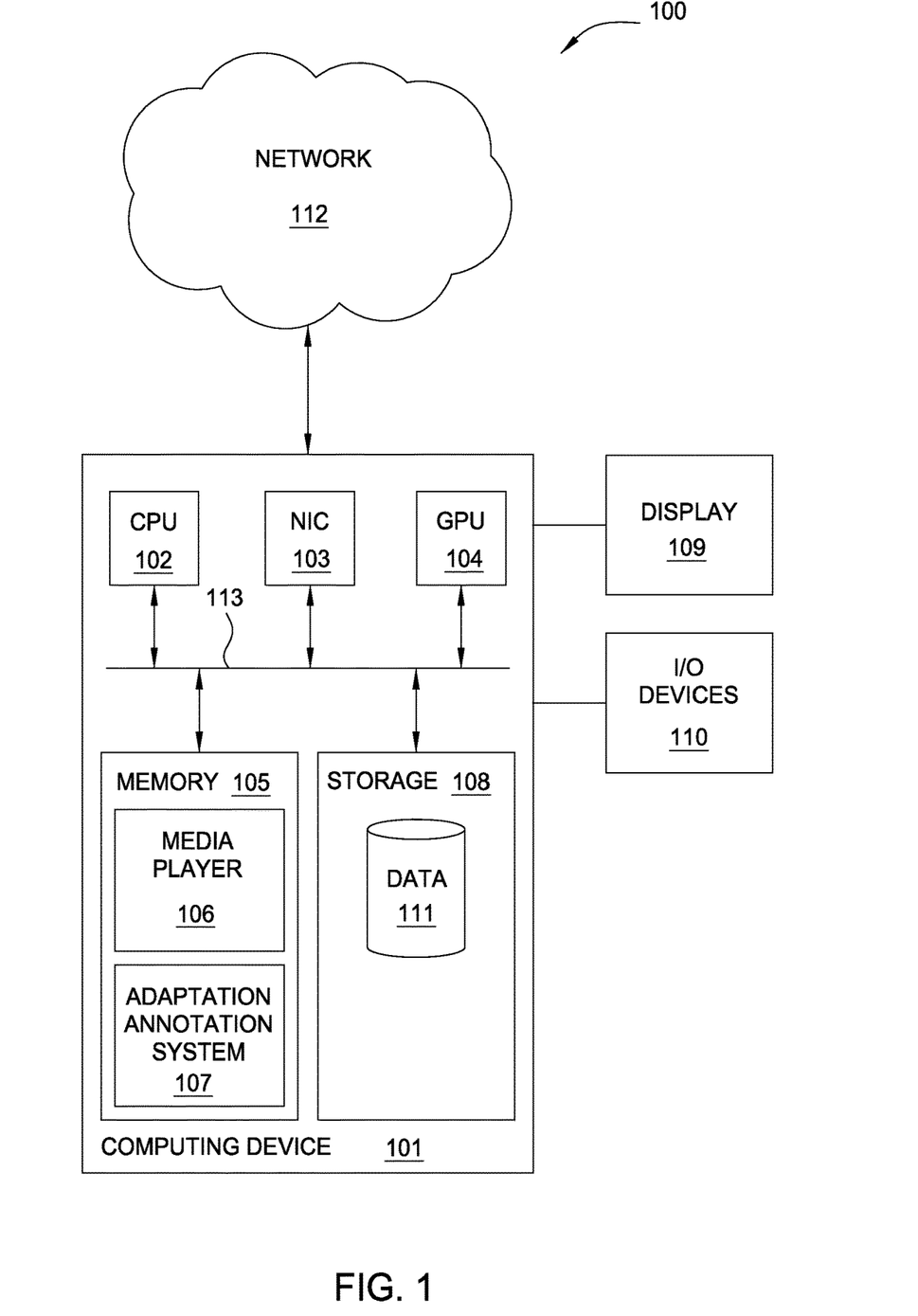
FIG. 1 illustrates an adaptive annotation system, according to one embodiment.

FIG. 1 illustrates an adaptive annotation system 100, according to one embodiment. As shown, the adaptive annotation system 100 has a computing device 101 and a network 112. The network 112 connects the computing device 101 to other computing devices and resources available over a network 112. It is noted that the adaptive annotation system 100 described herein is illustrative and that any other technically feasible configurations fall within the scope of the present invention.

Computing device 101 may be a server, desktop computer, a laptop computer, a smart phone, a personal digital assistant (PDA), video game console, set top console, tablet computer, or other computing device configured to receive input, process data, and display images, and is suitable for practicing one or more embodiments of the present invention. Computing device 101 includes, without limitation, a central processing unit (CPU) 102, a network interface card (NIC) 103, a graphics processing unit (GPU) 104, input/output (I/O) devices 110, storage 108, and a memory 105 connected via a bus 113. Computing device 101 is connected to a network 112 via the NIC 103. Computing device 101 is configured to run a media player 106 and an adaptive annotation system 107 that reside in memory 105. Additionally, computing device 101 is configured to receive input from an end user via I/O devices 110, and is further configured to display graphical images and/or video to the end user via display device 109.

The processor may be any suitable processor implemented as a central processing unit (CPU) 102, a graphics processing unit (GPU) 104, an application-specific integrated circuit (ASIC), a field programmable gate array (FPGA), and/or another type of processing unit. CPU 102 and GPU 104 are programmable logic devices that execute instructions, logic and mathematical processing, and may be representative of one or more CPUs multi-core CPUs, and/or GPUs, and the like. The CPU 102 is configured to execute program instructions associated with a particular instruction set architecture (ISA) specific to the CPU 102, including the media player 106 and the adaptive annotation system 107. The CPU 102 is also configured to retrieve data 111 from the storage 108 and transmit the data 111 to I/O devices 110, storage 108 and memory 105. In one example, GPU 104 periodically delivers pixel data 111 to a display device 109 with an analog or digital signal.

I/O devices 110 include devices that may be used to input data to computing device 101 or devices that output data from computing device 101. I/O devices 110 may include input devices, such as a joystick, a switch, a microphone, a video camera, a keyboard, a mouse, a touchpad, an interactive pen display, and/or a pen tablet, among others. I/O devices 110 may also include one or more output devices, such as a display screen, a speaker, a projector, or a printer, among others. In addition, I/O devices 110 may include devices used to input data to or output data from computing device 101, a serial port, a compact disc (CD) drive, or a digital video disc (DVD) drive, among others. In some embodiments, computing device 101, couple to a network 112, may have one or more of I/O devices 110.

Display device 109 may be a computer monitor, a video display screen, a display apparatus incorporated into a hand held device, any conventional CRT or LED monitor, or any other technically feasible display screen configured to present video media to an end user. In some embodiments, display device 109 is a terminal window displayed on another display device, such as a video display window that has been opened by a web browser.

Network 112 may be any technically feasible type of communications network that allows data to be exchanged between computing device 101 and external entities or devices, such as a hosted website on a server computing system. Examples of network 112 may include a wide area network (WAN), a local area network (LAN), a wireless (WiFi) network, and/or the Internet, among others.

Memory 105 may be a hard disk, a flash memory stick, a compact disc read-only memory (CD-ROM), a random access memory (RAM) module, or any other type of volatile or non-volatile memory unit capable of storing data. Memory 105 includes various software programs that can be executed by processor (CPU) 102, including software application media player 106, and adaptive annotation system 107, of which are described in greater detail below. The adaptive annotation system 107 includes a player and an authoring application (AASAA). The AASAA is used for making edits to the media file annotation and creating additional annotation suitable for playback speeds, of the media file, other than the normal 1:1 playback speed. The adaptive annotation system 107 may likewise be provided in a monolithic, client server or other program architectural style.

It will be appreciated that the configuration of adaptive annotation system 100 described herein is illustrative and that variations and modifications are possible. Any technically feasible connection topology, including various arrangements of bridges or additional processors, falls within the scope of the present invention. For instance, in some embodiments, memory 105 and/or other devices may be connected to CPU 102 through a memory bridge rather than directly. In other alternative topologies, CPU 102 may include a separate display processor. In addition, the configuration of the adaptive annotation system 100 described herein may include additional and/or optional components. For instance, any number of networks 120, I/O devices 110, or server computing systems 130 may be included.

Figure 2:
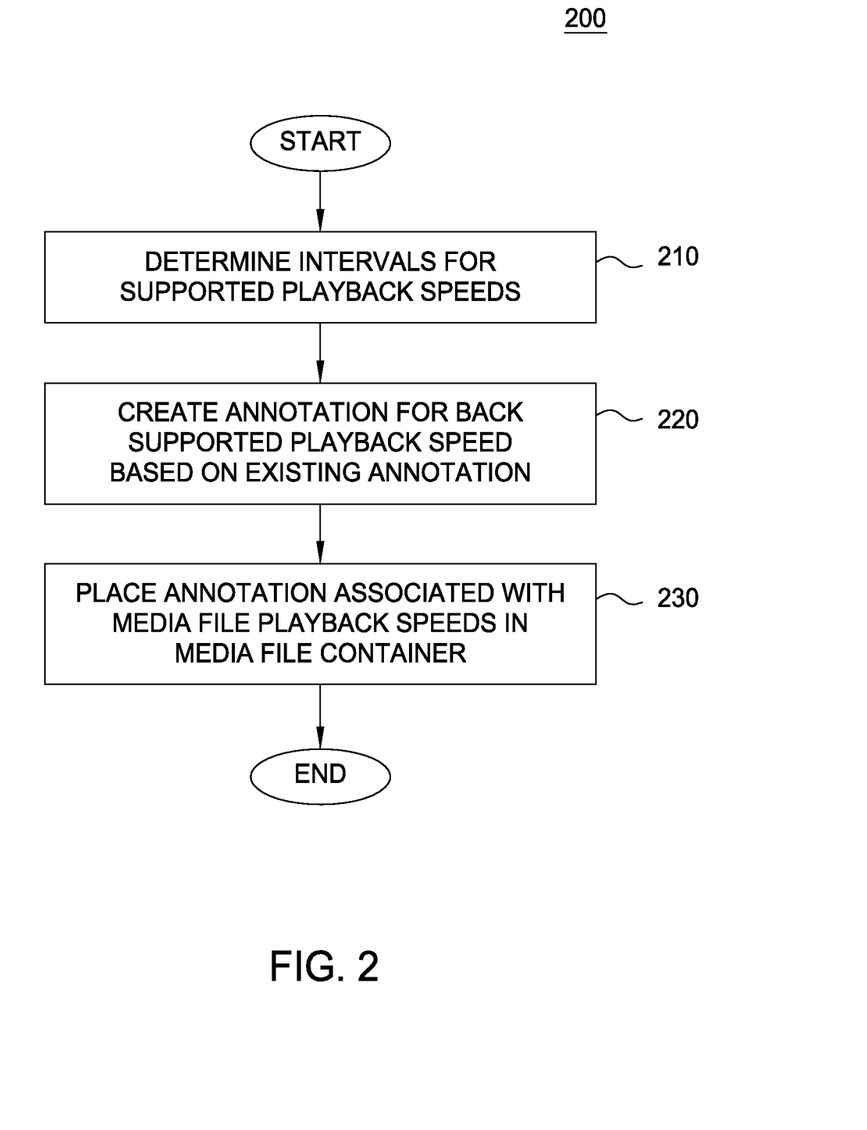
FIG. 2 illustrates a method for manually generating an annotation adapted to the playback speed of a media file, according to one embodiment.

FIG. 2 illustrates a method 200 for manually generating an annotation adapted to the playback speed of a media file, according to one embodiment. The annotation for the media file may be for a 1× playback speed and include text, audio, video, graphics or any combination thereof. In step 210, the media file is opened in the adaptive annotation system authoring application (AASAA) and playback speed intervals are determined for the media file. A set of playback speeds are chosen based on a video player limitations. Additionally, the chosen playback speeds may be limited to speeds where annotation content is likely to remain comprehensible when viewing the media file. For instance, a media file played at 20× the normal 1:1 speed may progress through the material so rapidly that even the most basic annotation is incomprehensible. In one embodiment, playback interval speeds for creating annotation is determined to be 0.5×, 1.5×, 2×, 5×, and 10× the normal 1:1 playback speed of a media file.

In step 220, an annotation is created for each playback speed. The creation of the annotation is based on the annotation provided at the normal 1:1 speed. Annotation, created for speeds less than the normal 1:1 playback speed of the media file, has additional available time to display during the media file playback. Slowing down the frame rate provides additional time for enhancing a media file annotation. However, depending on the nature of the annotation, altering annotation under this scenario presents different challenges. For instance, while text annotation may be left alone, or supplemented to include additional material, audio annotation should be adjusted. In one embodiment, the audio annotation is played at the same rate but over fewer frames. In another embodiment, additional audio is provided to fill in the additional time covering the playing of the frames. In yet another embodiment, the audio track is omitted altogether for a media file playback speed less than normal 1:1.

In other cases, playback speeds may be exceeding the normal 1:1 speed. In these cases, the video and annotation frames are provided to a user in a period of time shorter than if played at the normal playback speed. This has the effect of annotation being provided faster than a user may be able to comprehend. Therefore a determination is made as to how much annotation a user may effectively consume while playing the media file at the faster rate. For instance, if a line of text is available on screen for two minutes at a normal rate and playback is sped up to 2× the normal rate, the same line of text would now have to be read, and comprehended, in only one minute. If the payback is sped up to 5× the normal rate, the line of text will only be available for twenty four seconds. If this is unacceptable, text may be concatenated with subsequent lines of text, compressed, or skipped altogether.

Graphic elements, which are small in size, may also become difficult to even perceive when viewed at a very rapid rate. The graphic elements may also have presentation styles associated with them as well. For instance, a graphic element may be animated and slide or fade in. An author may increase the size of the graphic element or remove presentation styles in order to provide a user with a more noticeable annotation. The author may completely change the graphics based on the media file playback speed to capture those important aspects the annotation was there to convey. In one embodiment, graphic elements are enlarged and less frequent in a 10× playback speed.

Audio annotation is provided in some media files as a voice over. An example may be a director's cut of a movie scene in which a director explains the idiosyncrasies of a particular shot. In a conventional media player, most audio is muted during playbacks at speeds greater that the normal 1:1 playback speed. The AASAA adapts the audio annotations for additional audio tracks based on the playback speed of the media file.

A media file playing at 0.5×, 1×, 2×, 5× or 10× may have unique audio annotation tracks sequenced to the media file. That is, an author could manually create multiple versions of annotations for each different playback speed. For example, a 10× annotation set would provide very brief high-level information (since the video is playing back 10 times as fast), whereas the 0.5× annotation set would provide twice as much content as the default annotation set.

In step 230, annotations created at step 220 are associated with the different playback speeds of a media file and saved in the media file container. Alternately, the adapted annotation may be stored in the memory, cache or other, and retrieved by the AASAA upon playback of the media file. However, for manually generated an annotation, providing the storage location in the media file container is the most convenient and portable when sending the media file to a user. As the container does not describe how the data is encoded, a file saved in such a manner is still available for playing on a conventional media player. Albeit, without the adapted annotation. The media file container may be based on a standard. Using a media file container has the benefit that it is readable by a wide range of media players. Again however, a player not configured to read the additional data elements present in the file would not be able to display the adapted annotation. A file container may be proprietary and designed to work with the adaptive annotation system media player. Such an adaptive annotation player is configured to understand the multitude of annotation data elements and how to present the annotations during playback.

Whenever a point in a medial file with a corresponding annotation is viewed, the, the annotation associated with the current playback speed is used. If the playback speed does not have annotation matching the playback speed, the annotation for the next higher playback speed may be used. For example, if the video is playing back at a 9× playback speed, then the annotation for the 10× playback speed may be used. Alternatively, a combination of annotation sets could be used. For example, If only 10× and 2× playback speed annotations are available, and the user wanted to play the video at a 5× playback speed, the system could use all of the annotation associated with the 10× playback speed, and then in the gaps during playback, use some of the annotation associated with the 2× playback speed.

Figure 3:
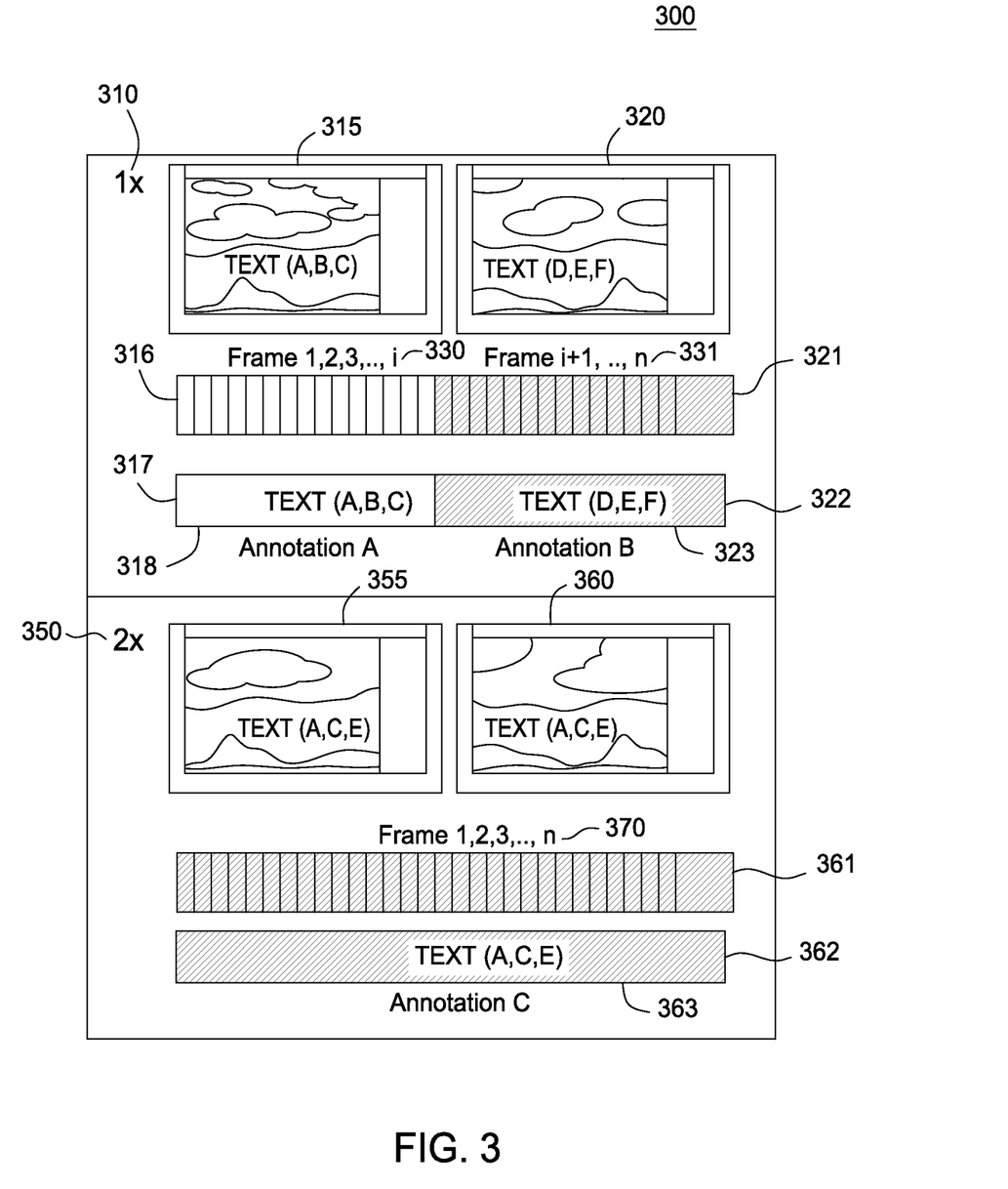
FIG. 3 illustrates an example for a sequence of video frames and associated annotation adapted to a 2× playback speed, according to one embodiment.

FIG. 3 illustrates an a sequence of video frames 300 and associated annotation adapted to a 2× 350 playback speed, according to one embodiment. As shown, a single media file stream played at both of 1× playback speed 310 and 2× playback speed 350.

The media stream at 1× playback speed 310 shows two sets of frames, frame set A 316 and frame set B 321. Frame set A 316 includes frames 1 to i 330 and includes video A 315. Frame set A 316 also has annotation A 317 which includes text A 318. Frame set B 321 includes frames i+1 to n 331 and includes video B 320. Frame set B 321 has annotation B 322 which includes text B 323. The media stream at 2× playback speed 350 has one frame set C 361. Frame set C 361 includes individual frames 1 to n 370, video C1 355 and video C2 360. Frame set C 361 also has annotation C 362 which includes text C 363.

The media file, playing at a 2× playback speed, combines frame set A 316 and frame set B 321 together to create an equivalent frame set C 361. That is, the example for 1× playback speed 310 and 2× playback speed 350 cover the same number of frames (1 to n) in the same media file. However, the frame rate for 2× playback speeds 250 is twice that as 1× playback speed 310 and therefore, a user viewing the media file would be done viewing in half the time while viewing the 2× playback speed 250. Additionally, altered annotation has been created for different playback speeds. In this example, annotation text A 318 and annotation text B 323 is provided for a set of frames in the media file when played at 1× playback speed 310. However, at 2× playback speed 350, annotation text C 363 is shown instead for this same set of frames in the media file.

Example 300 illustrates a text annotation adapted from a normal 1:1 playback speed (1× playback speed 310) to a 2× playback speed 350. The example shows how annotation A 317 and annotation B 322 can be combined to create annotation C 362. Annotation C 362 was created from the annotation A 317 and annotation B 322, while still providing the same information content over the same number of frames. Although the figure depicts annotation sets associated with two playback speeds, 1× playback speed 310 and 2× playback speed 350, an annotation set may be associated with all available playback speeds. The annotation may be created before hand and stored in the file container or in memory. Furthermore, the annotation for the individual playback speeds may be generated manually, as discussed in FIG. 2, or created automatically as will be discussed in FIG. 4.

In one example, a user watches frames of a video at a 1× playback speed 310. Additionally, the file container for the video provides an annotation track. The viewed frames include frame set A 316 and frame set B 321. While viewing normal 1× playback speed 310, the annotation track displays annotation A 317 during frame set A 316 until reaching frame i+1, in frame set B 321, at which time annotation B 322 is displayed. The annotation is timed to coincide with the playback speed to allow a user ample time to view and comprehend the annotation at a particular playback speed.

Continuing with the example, the user watching frames of the video changes the playback speed from 1× 310 to 2× 350. At the 2× 350 playback speed the video is viewed at twice the speed. As the playback speed is increased, from 1× 310 to 2× 350, reading or comprehending the annotation can become challenging, or in some cases impossible. To accommodate the change in available time for viewing the annotation caused by the increased playback speed, alternate annotation sets are provided in the annotation track and associated with the 2× 350 playback speed. A video standard largely dictates how this may be done. Some standards have fixed frame rates while others have bit rate limits. Yet, presentation timestamps in the video metadata may be adjusted according to how long each frame is displayed. Embodiments herein are not limited to the methods for how a video is played at speeds other than 1× 310. New annotation is created for the 2× 350 playback speed and associated with the 2× 350 playback speed. Now instead of viewing annotation A 317 and annotation B 322, while viewing frames 1-n 370 of the video, the user views annotation C 363.

In the same example, annotation A 317 contains text (A, B, C) and annotation B 322 contains text (D, E, F), the annotation is displayed with frames 1-n and timed for the 1× 310 playback. Annotation C 363 has content derived from annotation A 317 and annotation B 322. However, annotation C 363 is timed for the 2× 350 playback speed for frames 1-n of the video. Annotation C 363 is generated and contains text (A, C, E). Annotation C may be generated automatically or manually. Annotation C may also contain entirely new or different, content altogether.

Manually creating the annotation allows an author to preserve the essential content of the annotation in the video playback. However, manually creating the annotation is time consuming. This consumption of time is compounded when supporting a variety of playback speeds and a variety of different annotation types. Therefore embodiments of the invention also include techniques for automatically generating annotation for playback speeds greater than the 1× normal playback speed.

Figure 4:
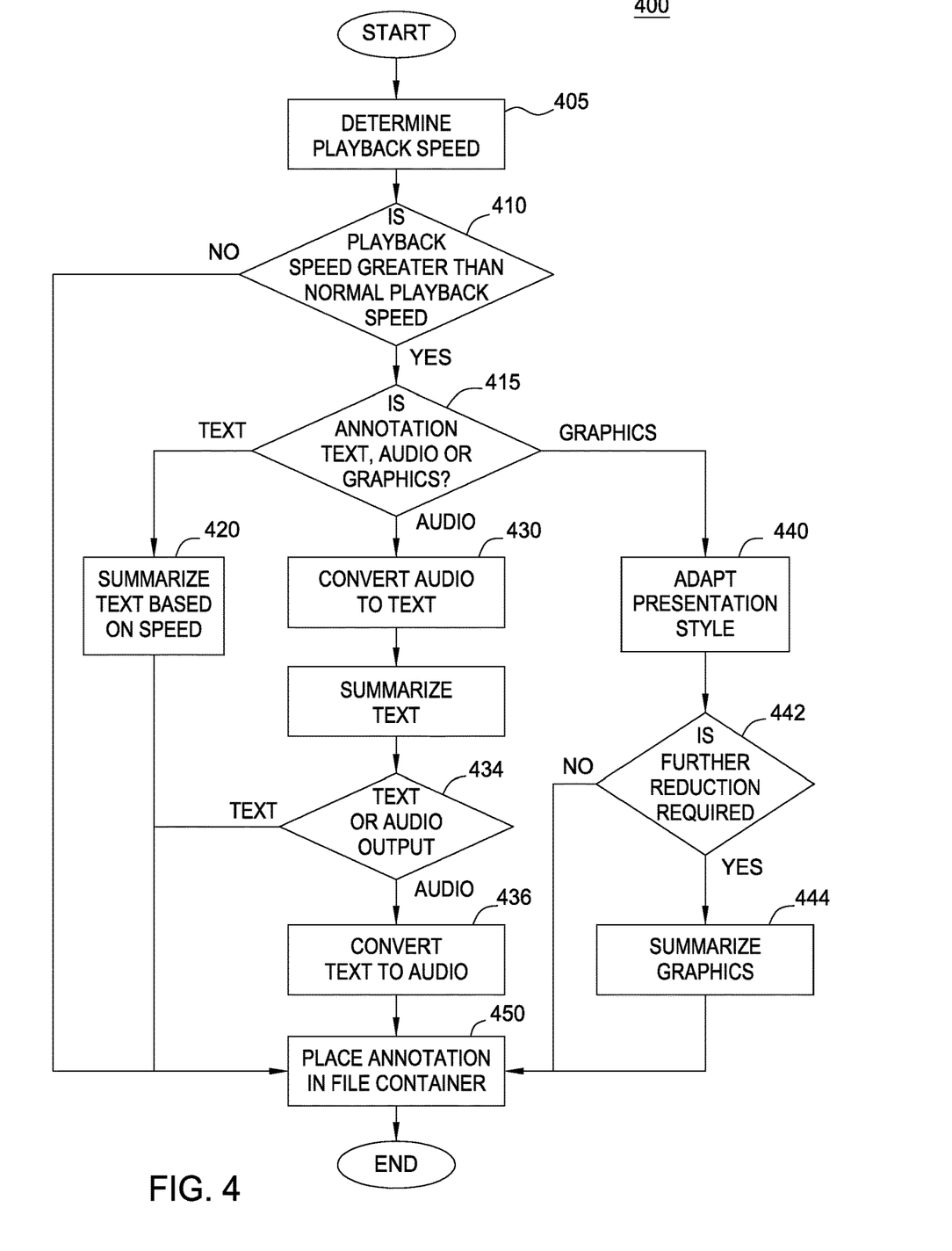
FIG. 4 illustrates a method for automatically generating alternate annotations adapted to the playback speed of a media file, according to one embodiment.

FIG. 4 illustrates a method 400 for generating alternate annotations adapted to the playback speed of a media file, according to one embodiment. In step 405, the video file is opened in the adaptive annotation system authoring application (AASAA) and playback speeds are determined. This may occur when a user selects a playback speed for viewing the media file or when an author selects different playback speeds expressly for generating annotation to be placed in the file container. In step 410, with the playback speeds determined, the normal playback speed is used for generating alternate annotation. In step 410, if the playback speed is determined to be less than the normal 1× speed, i.e. ¼× (Slow motion), a new annotation is not generated. However, if the playback speed is determined to be greater than the normal 1× playback speed, the new annotation is created for the alternate playback speed.

In step 415, the annotation is examined to determine if it contains text, audio or graphic content. In some cases there may be both text and audio or even graphic content present in the annotation. Each type of annotation is treated differently to generate a new annotation to associate with a playback speed greater than the normal 1× playback speed. In step 420, the annotation associated with the 1× playback speed is used to generate an annotation suitable for the currently determined playback speed. In step 430, the annotation, associated with the 1× playback speed containing audio content, is used to create audio annotation suitable for the determined playback speed. In step 440, the annotation, associated with the 1× playback speed containing graphics content is used to generate graphics annotation suitable for the determined playback speed.

Figure 6:
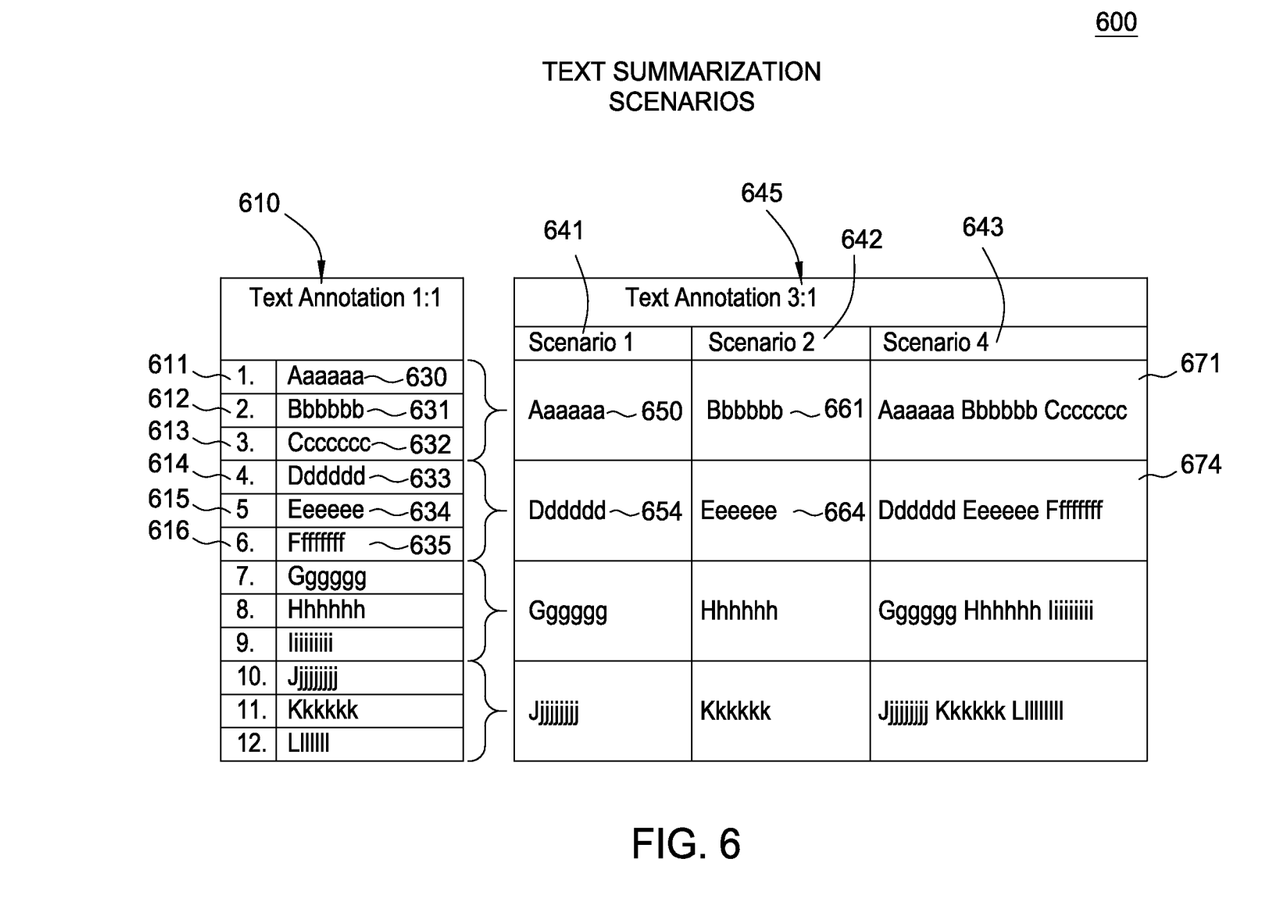
FIG. 6 illustrates several examples of summarized text adapted to a 3× playback speed of a media file, according to one embodiment.

In step 420, a text annotation is summarized based on the determined playback speed. FIG. 6 illustrates several examples for summarizing text 600 to a 3× playback speed of a media file, according to one embodiment. The summarized text 600 is presented in a table format. Text annotation 1:1 610 (Normal playback speed) has annotation associated with frame sets 611-616. The first frame set 611 has annotation Aaaaaa 630 associated with it. The second frame set 612 has annotation Bbbbbb 631 associated with it. The third frame set 613 has annotation Cccccc 632 associated with it. The fourth frame set 614 has annotation Dddddd 633 associated with it. The fifth frame set 615 has annotation Eeeeee 634 associated with it. The sixth frame set 616 has annotation Ffffff 635 associated with it. And so on.

Under normal playback speed, text Aaaaaa 630 is displayed during the playback of frame set 1 611. As the video progresses to frame set 2 612, text Bbbbbb 631 replaces text Aaaaaa 630 and is displayed. In the example of FIG. 6, frame set 1 611 through frame set 12 are shown as single entities associated with annotation. It should be understood that frame set 1 611 represents a period of time to read and comprehend the associated annotation and not a single video fame. For instance, an average person can read 250 words per minute with 70% comprehension. That is a little over 4 words per second. However, video standards have as few as 23 frames per second to thousands of frames per second. Therefore a single word could not be read in a single frame, and thus, the example frames are not actual single video frames but representative of time intervals associated with the annotation. Also, time intervals for the frame sets may be different. For instance, the time interval of frame set 1 may be longer than the time interval of fame set 2.

The summarized text 600 shows several scenarios for text annotated 3:1 645 for a video playback speed 3 times the normal 1:1 playback speed. As shown, there are 3 scenarios, scenario 1 641, scenario 2 642, and scenario 3. In scenario 1 641, frame set 650 is displayed for a 3:1 playback speed of the frame sets 611-613. In scenario 2 642, frame set 660 is also displayed for the 3:1 playback speed of frame sets 611-613. And in scenario 3 643, frame set 670 is displayed for a 3:1 playback speed of frame sets 611-613. At a 3:1 playback speed, 3 times the content is now provided during the same time frame. In other words, a viewer has ⅓ the time to view the provided content. Therefore, a viewer has ⅓ the amount of time to viewed text annotation Aaaaa 630, Bbbbbb 631 and Cccccc 632 when played at 3:1 playback speed. Such a rate may be unacceptable for comprehending the material being presented.

In one example for text summarization, 1:1 text annotation Aaaaa 630, Bbbbbb 631 and Cccccc 632 is summarized to Aaaaa 651 when viewed during 3:1 playback. In this scenario, for the 3:1 playback speed, scenario 1 641, the algorithm may be used to select the first 1:1 text annotation 610 and display the annotation for a time period spanning the 3:1 playback of frame 1 611 to frame 3 613. For example, the first 1:1 text annotation Aaaaa 630 is reproduced as the 3:1 text annotation Aaaaa 651 during the display of frame set 650. The display of the video at the 3× playback speed progresses past the end of frame set 650 and then to frame set 655. Frame set 655 displays 3:1 text annotation 645 corresponding to the three 1:1 text annotation 610 frames 4 614, frame 5 615, and frame 6 616. Following the algorithm for scenario 1 641, 1:1 text annotation Ddddd 633, Eeeee 634 and Fffff 635 is summarized to Ddddd 654 when viewed during 3:1 playback.

In another example algorithm for text summarization, 1:1 text annotation Aaaaa 630, Bbbbbb 631 and Cccccc 632 is summarized to Bbbbb 661 when viewed during 3:1 playback. In this scenario for the 3× playback speed, scenario 2 642, an algorithm may be used to select the middle 1:1 text annotation 610 and display the annotation for a time period spanning the 3:1 playback of frame 1 611 to frame 3 613. The display of the video at the 3× playback speed progresses past the end of frame set 660 and then to frame set 665. Frame set 665 displays 3:1 text annotation 645 corresponding to the three 1:1 text annotation 610 frames 4 614, frame 5 615, and frame 6 616 and displays text annotation Eeeee 664 during the viewing of these frames.

In yet another example algorithm for text summarization, 1:1 text annotation is summarized to Aaaaa Bbbbb Ccccc 671 when viewed during 3:1 playback. In this scenario for a 3:1 playback speed, scenario 3 643, an algorithm may be used to concatenate the 1:1 text annotation 610 and display the annotation while viewing frame set 670. The display of the video, at the 3× playback speed, progresses past the end of frame set 670 to frame set 675 and displays text annotation Ddddd Eeeee Fffff 674 during the viewing of these frames.

However, there are numerous algorithms for determining the combining of annotation from a 1:1, normal, playback speed to a 3:1 playback speed. For instance, key terms may be extracted from the 1:1 annotation and combined for a 3:1 playback speed. The 3 scenarios presented merely demonstrate the viability of automatically determining text annotation for variable playback speeds.

Returning back to step 420 in FIG. 4, text annotation is summarized based on an algorithm. In one embodiment, the annotation is created for the current playback speed. Alternately, annotation is created for a discrete range of playback speeds. Determining the annotation in advance for the discrete range of playback speed provides the player with quick access to annotation for a variety of playback speeds as the player changes the playback speeds. In step 450, the text annotation is associated with a playback speed and placed in the file container. Alternatively, automatically generated text annotation may be placed in memory for retrieval during playback.

In the event the annotation was determined to be audio annotation (at step 415), the audio is converted to text in step 430. Using existing algorithms, a text transcript is generated from the audio annotation track. The text transcript may be configured to include the audio portion of the video file as well. The newly created audio text is created at the 1:1 playback speed and associated with the video. As audio covers a set of frames, the generated audio text may be associated with an entire set of frames associated with the audio. For instance, if a portion of the audio annotation is 30 seconds long, the generated text annotation may be associated with the frames coinciding with the same 30 second interval of the video. In step 432, the audio text is summarized based on the playback speed. The operations performed in step 432 are the same as those performed in step 420. That is, frame sets may be concatenated based on the playback speed. An example for summarizing text from a 1:1 playback speed to a 3:1 playback speed was previously described while referring to FIG. 6.

In step 434, the summarized audio text is placed back in the video. Video played back at higher speeds typically drop the audio. Additionally, the text to speech may cause unwanted change in the narration voice. Therefore, keeping the audio annotation as a text annotation for higher playback speeds may be warranted. In these cases, the audio text is handled the same way as regular text annotation is handled. In step 450, the summarized audio text, associated with the higher playback speed and a set of video frames, is saved in the media file container and displayed while the corresponding frames of the video are played at the higher playback speed.

However, audio can also be played at the higher playback speed. In step 436, the summarized audio text is converted to a summarized audio. The summarized audio is associated with the higher playback speed and the sequence of video frames from which the summarized audio text were associated with. In step 450, the summarized audio is saved into the video file container and displayed while the corresponding frames of the video are played at the higher playback speed.

Alternatively, the system may skip steps 430 to 436 and skip audio annotation based on playback speed. For instance, a 10× playback speed for the video may result in every $10^{th}$ audio narration sentence playing instead of playing every single one. This would automatically provide the audio narration in the author's voice regardless of the payback speed.

In the event the annotation was determined to be of a graphics nature (at step 415), the presentation style of the graphics is adapted to the alternate playback speed. Graphical annotation may include graphical marks such as arrows, shapes, figures, callouts, etc. In step 440, the presentation style of the graphic annotation defined for 1× playback speed and operating at a 10× playback speed, may be modified to omit the short duration graphical annotations or alter the fade in/fade out of graphic elements. Other animation may be omitted in the presentation to reduce the time associated with introducing the graphical annotation as opposed to the time available for viewing the annotation. This omission of presentation elements may be sufficient for a 2× or 3× playback speed, however at higher playback speeds, such as 10×, this omission may still not provide enough time to view and comprehend the graphical annotation. In step 442, further reduction in the graphical annotation is determined for viewing and comprehension. If no further reduction is required, in step 450, the currently reduced graphical annotation is placed in the file container and associated with the corresponding sequence of video frames.

In step 444, graphical annotation requiring further reduction is summarized. For instance, graphics smaller than a particular size may be omitted leaving only large marks or shapes. If the only graphics present are smaller sized annotation, the small graphic may be enlarged to make them more visible. Alternately, graphics played at the 10× playback speed for the video may result in only those graphic elements associated with every $10^{th}$ frame set being displayed instead of playing every single graphical element. In step 450, the summarized graphics are associated with a playback speed and saved in the file container.

As described above, an annotation may be created automatically or manually, regardless of whether the annotation is text, graphics or audio. The choice may in practice depend on factors such as time constraints, quantity of annotation in a video, and the importance of the annotation at each alternate playback speed. Depending on these factors, the annotation may be pre-populated into the file container or generated in real time as needed.

Figure 5:
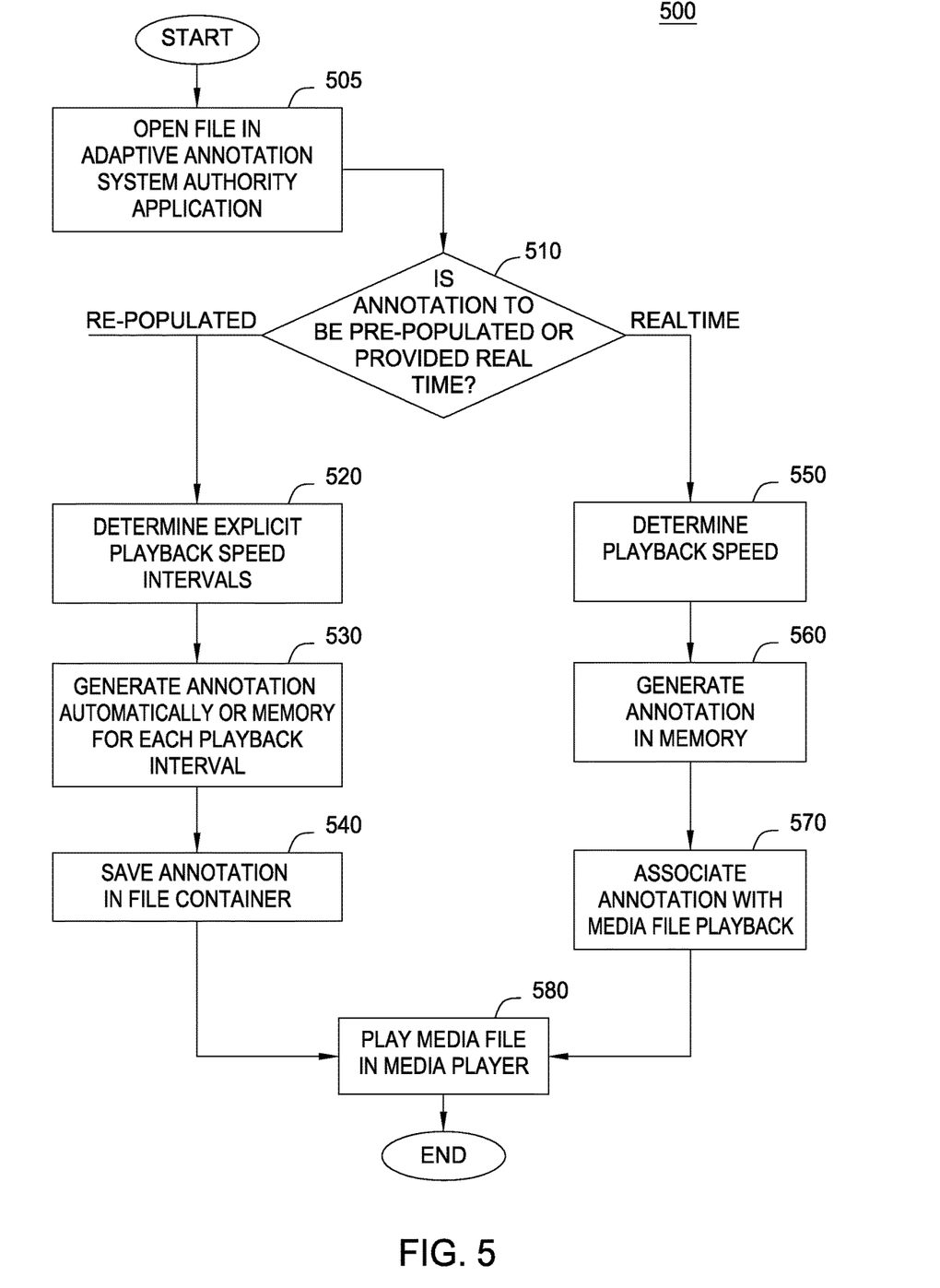
FIG. 5 illustrates a method for providing an annotation adapted to the playback speed of a media file, according to one embodiment.

FIG. 5 illustrates a method for providing an annotation adapted to the playback speed of a media file, according to one embodiment. In step 505, the video file is opened in the adaptive annotation system authoring application (AASAA). The AASAA opens the file container and is able to view and associate multiple annotation files in a file container to different playback speeds. For instance, a media file may have text audio annotations associated with the 1× playback speed and a separate text annotation associated with a 2× playback speed. The AASAA strips separate annotation files out from the file container, adding the annotation files into the media file container or even performing edits to the annotation files within the media file container.

In step 510, a new annotation is created and pre-populated into the media file container. Doing so provides a quick response by the system when the media file is being played as the annotation is already available for playback and does not need to be created at the time of viewing. In step 520, discrete playback speeds are determined for the new annotation. For instance, a media file containing annotation for the 1× playback speed may have a need for the annotation to be present at the 2× playback speed, and 5× playback speed. The playback speeds capable of supporting a quantity of annotation is determined. For instance, the annotation at the 5× playback speed may have $\frac{1}{5}^{th}$ the amount of annotation as the 1× playback speed. Additionally, a 16× playback speed may have no annotation as that speed is too fast to support comprehension of any annotation.

In step 530, an annotation may be generated in real-time or in advance for each pre-determined playback interval. For playback speeds less than or slower than 1×, the additional playback time provides for additional annotation to be added to the media file. The annotation may be created such that additional annotation content may be added that was not previously part of the annotation. The annotation, associated with the 1× playback speed, may be copied and then edited or an algorithm may adjust the presentation style to accommodate the additional time. For instance, a presentation style which "flies" in annotation may have the time adjusted such that the start occurs later or the transition time is longer. The newly edited annotation is associated with the appropriate playback speed. Note, an annotation may be associated with more than one playback speed. In step 540, the annotation is saved into the file container. The file container may be a proprietary file container or a variety of other file container formats which support annotation, such as MP4. Each annotation, saved into the file, is associated with a playback speed.

Going back to the second branch of step 510, the new annotation may alternatively be created in real-time, or on the fly. The annotation is created in real time automatically. The real-time annotation is useful when viewing media previously created which already contains some annotation. As a user plays back the media file at a speed greater than the 1× playback speed, the annotation is adjusted to reflect the new playback speed. In step 560, annotation is stored in memory. The memory affords quick access to the content without expensive (time consuming) read/writes to a disk. Thus, storing annotation in memory improves the response time for providing the annotation to the player all the while minimizing the wait time for content to be generated. Therefore enhancing the user's viewing experience while playing a media file, which contains annotation, at a speed other than normal 1:1.

In step 570, the annotation is associated with the media file and the playback speed. The generated annotation may be available in memory until space is needed. In this manner, a user may skip back and review a section of the media and still benefit from the annotation already stored in the memory. Additionally, the real-time generated annotation may be placed in the media file container and made available for future viewing.

In step 580, the media file is played in the media player. An annotation associated with the current playback speed is displayed. Depending on parameters established for viewing the media file, the annotation may be taken from only within the media file container, or may be dynamically generated if a pre-populated annotation is not already available. Alternately, an annotation associated with a next higher playback speed may be played instead of generating an annotation in real time. In yet another alternative, an annotation may be displayed until changes are detected in the displayed scene. In such an instance the text or graphics annotation may be stretched on the timeline of the media file. An Audio annotation does not stretch without noticeable changes and may have pauses placed at the beginning or end of the audio track to sequence the audio with the frames of the media file.

In the following, references are made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized for storing a program product which, when executed, is configured to perform the methods for adapting video annotations to a playback speed. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention may be provided to end users through a cloud computing infrastructure. Cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. In context of the present invention, a user may access applications (e.g., the adaptive annotation system) or related data (e.g., media files) available in the cloud. For example, the adaptive annotation system engine could execute on a computing system in the cloud. In such a case, the adaptive annotation system could access data at a storage location in the cloud. Doing so allows a user to access this system and information from any computing system attached to a network connected to the cloud (e.g., the Internet).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the foregoing description, numerous specific details are set forth to provide a more thorough understanding of an adaptive annotation system. However, it will be apparent to one of skill in the art that the invention may be practiced without one or more of these specific details. In other instances, well-known features have not been described in order to avoid obscuring the invention.

In an embodiment, the adaptive annotation system receives a media file for playback. The media file has text annotation sets corresponding to frames in the media file and displays the annotation during normal playback speed. During a playback speed three times (3×) greater that the normal playback speed, the adaptive annotation system authoring application automatically creates new 3× annotation in real-time for the 3× playback speed. The new 3× annotation takes each third annotation set from the normal playback and displays that annotation set during the media file frames corresponding to all three annotation sets. The new 3× annotation is associated with the corresponding media file frames and only plays during the 3× playback speed. The new 3× annotation is saved in the media file container for playback.

In sum, the present application describes techniques for altering annotation associated with a media file. The technique includes receiving the media file which contains annotation associated with a playback speed of the media file. Determining a disparate playback speed for the media file. Then altering the annotation associated with the original playback speed of the media file to a new annotation associated with the disparate playback speed of the media file. The new annotation is then provided to a user upon the user selecting the disparate playback speed for the media file.

While the foregoing is directed to embodiments of the present invention, other and further embodiments of the present invention may be devised without departing from the basic scope thereof. In view of the foregoing, the scope of the present invention is determined by the claims that follow.

What is claimed is:

1. A method, comprising:
receiving a media file that includes a first annotation, wherein the media file concurrently plays back the first annotation when the media file is played back at a first playback speed;
while playing back the media file, receiving a first input specifying a second playback speed of the media file;
in response to receiving the first input specifying the second playback speed, altering, at a processor, the first annotation based on the first annotation, the second playback speed of the media file, and a length of time that the first annotation is displayed during playback of the media file to generate a second annotation, wherein the second annotation is different than the first annotation; and
associating the second annotation to the second playback speed, wherein the media file, when played at the second playback speed, concurrently plays the second annotation.

2. The method of claim 1, further comprising:
saving the second annotation, associated with the second playback speed, in a media file container, of the media file, for access when viewing the media file at the second playback speed.

3. The method of claim 1, further comprising:
saving the second annotation, associated with the second playback speed, in a memory location for access when viewing the media file at the second playback speed.

4. The method of claim 1, further comprising
converting an audio annotation to a text;
altering the text to conform to a new playback speed; and
converting the text back to a second audio annotation and associating the second audio annotation to the new playback speed.

5. The method of claim 2, further comprising:
receiving a third playback speed for the media file;
generating a third annotation for the third playback speed of the media;
associating the third annotation to the third playback speed, wherein the media file, when played at the third playback speed, concurrently plays the third annotation; and saving the third annotation, associated with the third playback speed, in the media file container, wherein the media file container includes the first annotation and second annotation.

6. The method of claim 5, wherein the first annotation and the third annotation are generated and saved into the media file container in advance of receiving the third playback speed.

7. One or more non-transitory computer-readable storage media comprising a program product which, when executed, is configured to perform an operation comprising:
receiving a media file that includes a first annotation, wherein the media file concurrently plays back the first annotation when the media file is played back at a first playback speed;
while playing back the media file, receiving a first input specifying a second playback speed of the media file;
in response to receiving the first input specifying the second playback speed, altering, at a processor, the first annotation based on the first annotation type, the second playback speed of the media file, and a length of time that the first annotation is displayed during playback of the media file to generate a second annotation, wherein the second annotation is different than the first annotation; and
associating the second annotation to the second playback speed, wherein the media file, when played at the second playback speed, concurrently plays the second annotation.

8. The one or more non-transitory computer-readable storage media of claim 7, further comprising:
saving the second annotation, associated with the second playback speed, in a media file container, of the media file, for access when viewing the media file at the second playback speed.

9. The one or more non-transitory computer-readable storage media of claim 7, further comprising:
saving the second annotation, associated with the second playback speed, in a memory location for access when viewing the media file at the second playback speed.

10. The one or more non-transitory computer-readable storage media of claim 7, further comprising
converting an audio annotation to a text;
altering the text to conform to a new playback speed; and
converting the text back to a second audio annotation and associating the second audio annotation to the new playback speed.

11. The one or more non-transitory computer-readable storage media of claim 8, further comprising:
receiving a third playback speed for the media file;
generating a third annotation for the third playback speed of the media;
associating the third annotation to the third playback speed, wherein the media file, when played at the third playback speed, concurrently plays the third annotation; and
saving the third annotation, associated with the third playback speed, in the media file container, wherein the media file container includes the first annotation and second annotation.

12. The one or more non-transitory computer-readable storage media of claim 11, wherein the first annotation and the third annotation are generated and saved into the media file container in advance of receiving the third playback speed.

13. A system, comprising:
one or more memories storing an application program; and
one or more processors which, when executing the application program, are configured to perform an operation comprising:
receiving a media file that includes a first annotation, wherein the media file concurrently plays back the first annotation when the media file is played back at a first playback speed;
while playing back the media file, receiving a first input specifying a second playback speed of the media file;
in response to receiving the first input specifying the second playback speed, altering the first annotation based on the first annotation type, the second playback speed of the media file, and a length of time that the first annotation is displayed during playback of the media file to generate a second annotation, wherein the second annotation is different than the first annotation; and
associating the second annotation to the second playback speed, wherein the media file, when played at the second playback speed, concurrently plays the second annotation.

14. The system of claim 13, further comprising:
saving the second annotation, associated with the second playback speed, in a media file container, of the media file, for access when viewing the media file at the second playback speed.

15. The system of claim 13, further comprising:
saving the second annotation, associated with the second playback speed, in a memory location for access when viewing the media file at the second playback speed.

16. The system of claim 13, further comprising:
converting the audio annotation to a text;
altering the text to conform to a new playback speed; and
converting the text back to a second audio annotation and associating the second audio annotation to the new playback speed.

17. The system of claim 14, further comprising:
receiving a third playback speed for the media file;
generating a third annotation for the third playback speed of the media;
associating the third annotation to the third playback speed, wherein the media file, when played at the third playback speed, concurrently plays the third annotation; and
saving the third annotation, associated with the third playback speed, in the media file container, wherein the media file container includes the first annotation and second annotation.

18. The system of claim 17, wherein the first annotation and the third annotation are generated and saved into the media file container in advance of receiving the third playback speed.

19. The one or more non-transitory computer-readable storage media of claim 7, wherein the first annotation comprises a first annotation type that comprises a text annotation, an audio annotation, or a graphics annotation, and further comprising, while playing back the media file, the altering the first annotation to generate the second annotation is further based on the first annotation type.

20. The one or more non-transitory computer-readable storage media of claim 7, wherein the altering the first annotation is performed while the media file is played aback at the second playback speed.

* * * * *

UNITED STATES PATENT AND TRADEMARK OFFICE
CERTIFICATE OF CORRECTION

Page 1 of 1

PATENT NO. : 10,891,428 B2
APPLICATION NO. : 13/951217
DATED : January 12, 2021
INVENTOR(S) : Fitzmaurice et al.

It is certified that error appears in the above-identified patent and that said Letters Patent is hereby corrected as shown below:

On the Title Page

Item (72) Inventors:
Please delete "George Frank Fitzmaurice" and insert --George Fitzmaurice--;

In the Claims

Column 15, Claim 7, Line 20:
Please delete "type";

Column 16, Claim 13, Line 14:
Please delete "type".

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*